Sept. 11, 1956          M. STAHL          2,762,410
NUT CRACKING MACHINE HAVING ROTARY CRACKING WHEELS
Filed May 16, 1952          4 Sheets-Sheet 1
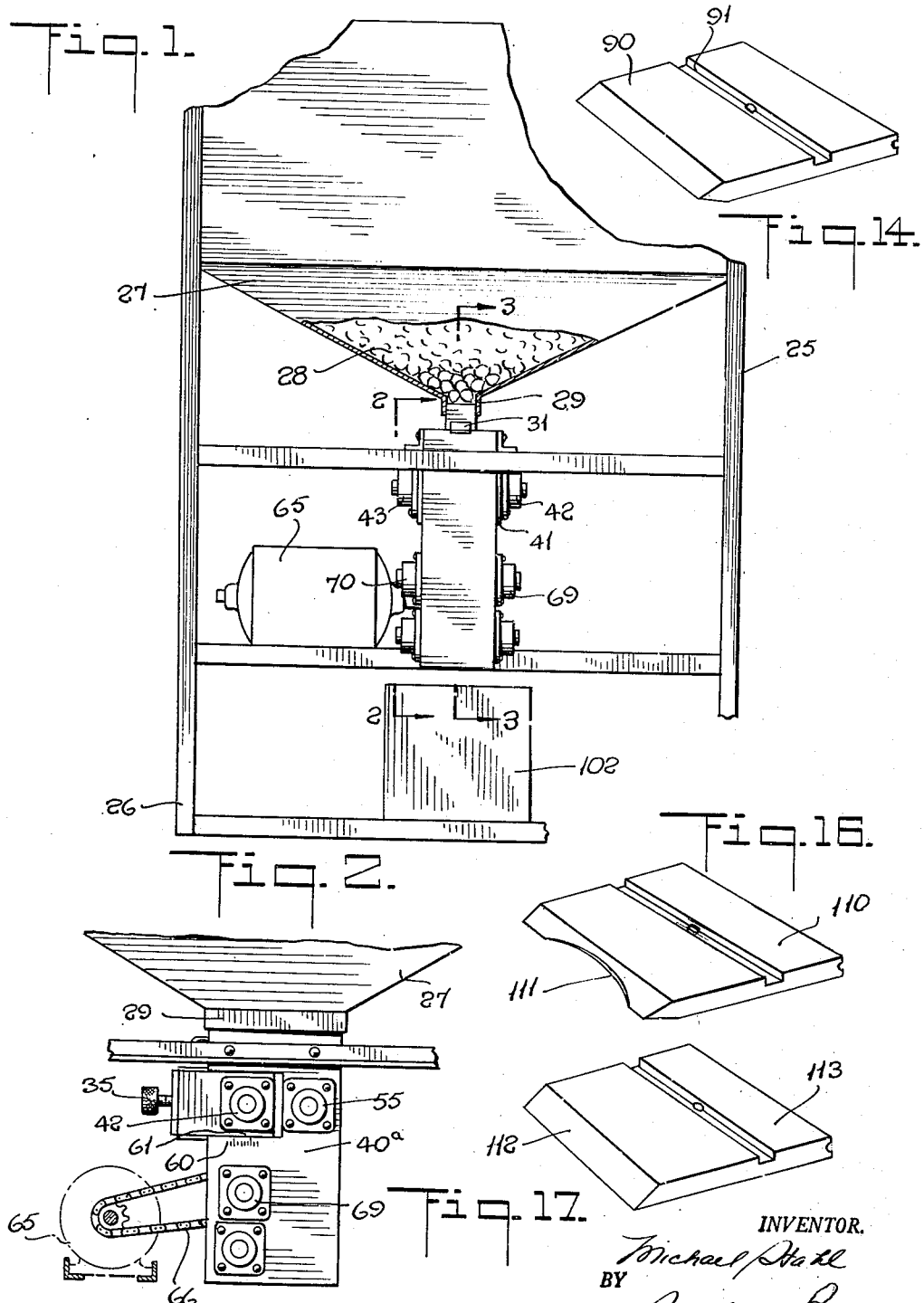

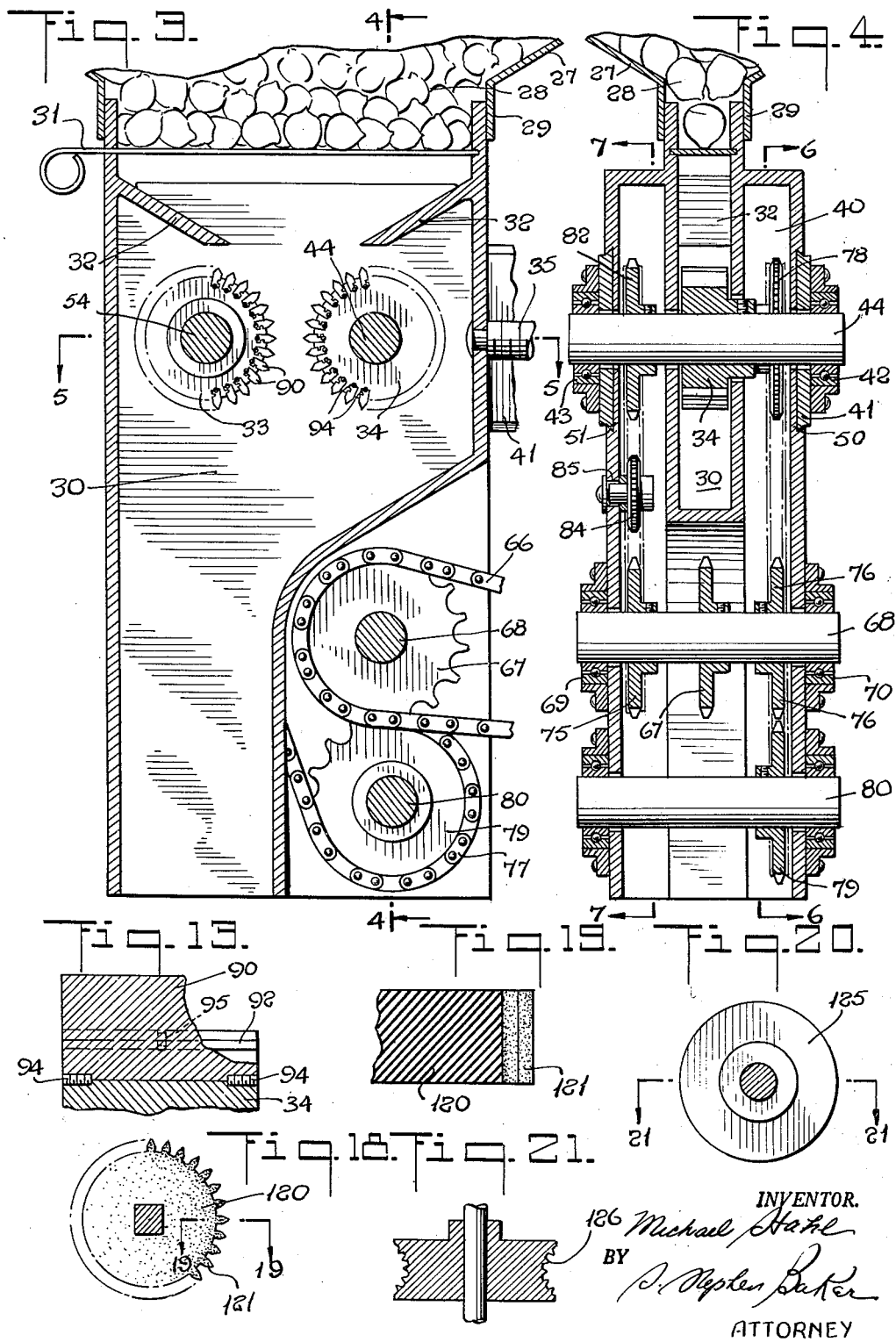

Sept. 11, 1956 M. STAHL 2,762,410
NUT CRACKING MACHINE HAVING ROTARY CRACKING WHEELS
Filed May 16, 1952 4 Sheets-Sheet 3
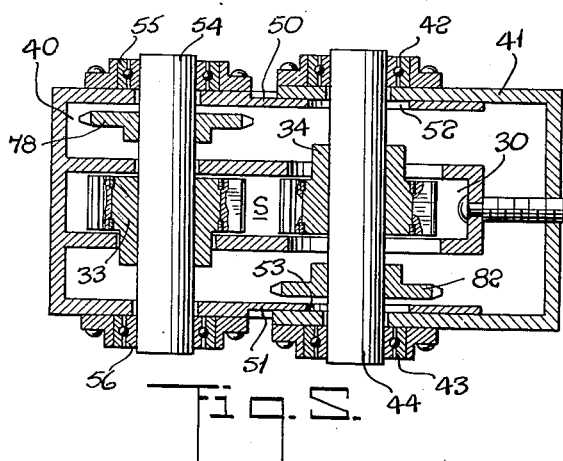
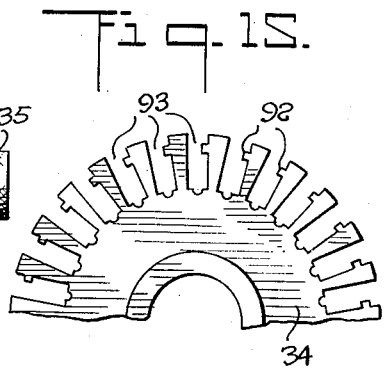
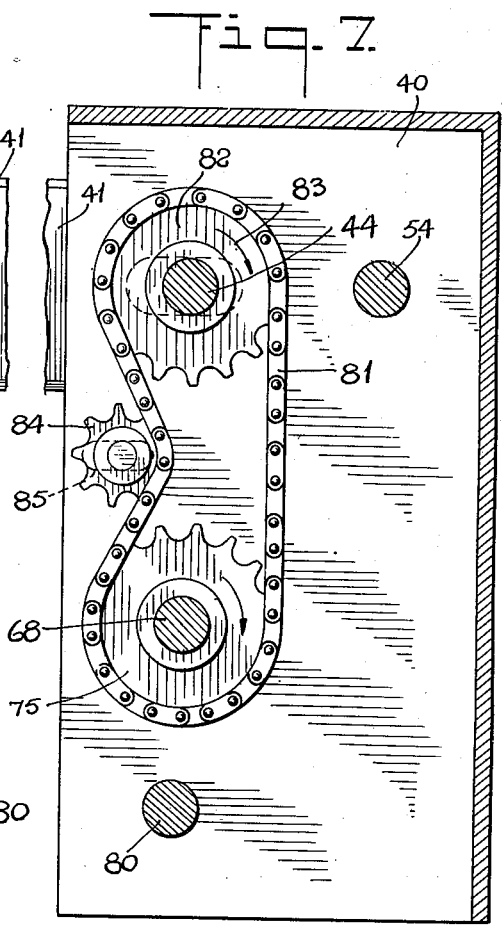
INVENTOR.
Michael Stahl
BY
P. Stephen Baker
ATTORNEY Sept. 11, 1956            M. STAHL            2,762,410
NUT CRACKING MACHINE HAVING ROTARY CRACKING WHEELS
Filed May 16, 1952            4 Sheets-Sheet 4
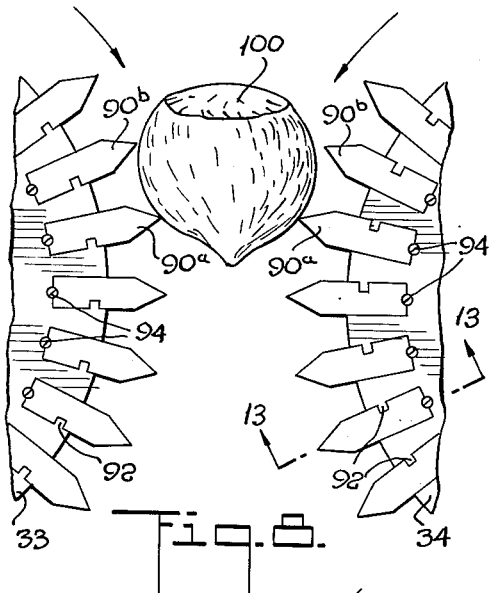
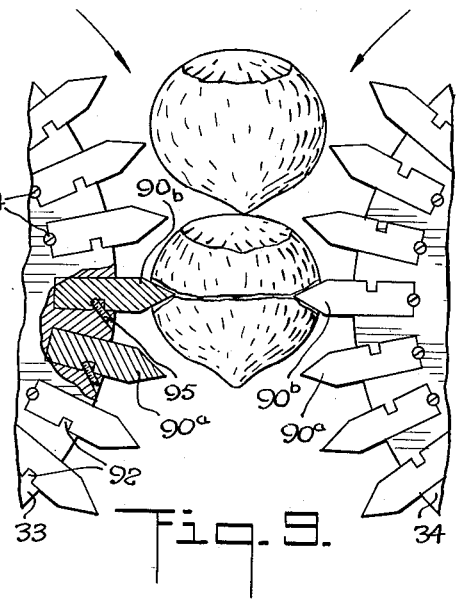
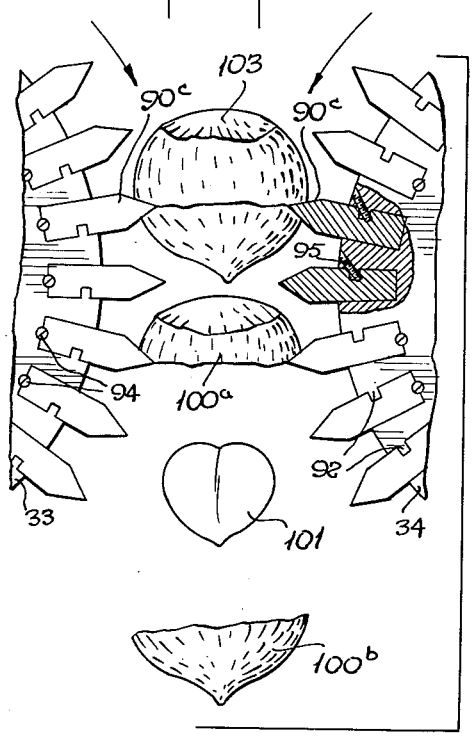
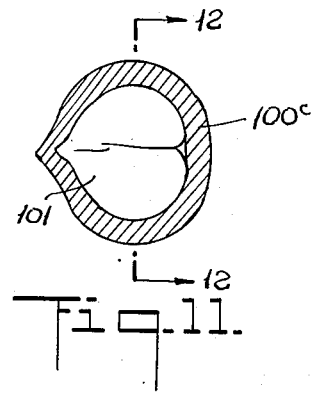
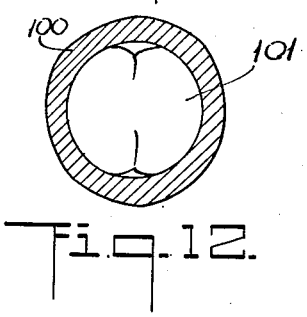
INVENTOR.
Michael Stahl
BY
S. Stephen Baker
ATTORNEY ns
2,762,410

NUT CRACKING MACHINE HAVING ROTARY CRACKING WHEELS

Michael Stahl, Brooklyn, N. Y.

Application May 16, 1952, Serial No. 288,129

1 Claim. (Cl. 146—10)

This invention relates to nut cracking machines and is applicable to various types of nuts as will hereinafter be described. The principal embodiment of the invention is illustrated as a machine for cracking hard shelled nuts although other embodiments are illustrated and described.

The instant invention provides a novel and simplified machine for cracking the shells of nuts to produce a relatively high proportion of whole nut meats as compared to fragments. The machine of the instant invention cracks nuts expeditiously and with a minimum of meat fracture by sharply striking the shell with a swift blow from oppositely directed and oppositely actuated blades or teeth and thereafter separating the fractured portions of the shell to release the meat. The invention is realized by providing oppositely rotated cracking wheels between which the nuts are individually acted upon, the nuts being fed thereto from a hopper. Each wheel is provided with spaced, peripheral blades or teeth which are wedge-shaped and come to a sharp edge. These edges deliver a sharp, swift, cutting blow directed against opposite sides of the shell. This causes an effective split or fracture of the shell. The wedge-shaped blades then proceed further inwardly and separate the shell halves releasing the whole nut meat in most cases.

The wheels are adjustably spaced from each other in accordance with the size of the nut being handled and the speed of the wheels is calculated to produce the desired sharp impact against the nut shell for effectively accomplishing the cracking action.

The invention further embodies modifications of the cracking wheels for treating different types of nuts as will be hereinafter described.

The invention will be further understood from the following description and drawings in which:

Figure 1 is a front view partly in section, of the complete machine;

Figure 2 is a view taken along the lines 2—2 of Figure 1;

Figure 3 is an enlarged cross-sectional view taken along the lines 3—3 of Figure 1;

Figure 4 is a cross-sectional view taken along the lines 4—4 of Figure 3;

Figure 5 is a cross-sectional view taken along the lines 5—5 of Figure 4;

Figure 6 is a cross-sectional view taken along the lines 6—6 of Figure 4;

Figure 7 is a cross-sectional view taken along the lines 7—7 of Figure 4;

Figures 8 to 10 are successive views illustrating the cracking action;

Figure 11 is a plan view of a split nut showing one-half of the shell and the meat;

Figure 12 is a cross-sectional view taken along the lines 12—12 of Figure 11;

Figure 13 is a sectional view illustrating the connection of a tooth to the cracking wheel;

Figure 14 is a perspective view of the removable tooth;

Figure 15 is an elevational view, partly broken away, of a cracking wheel with the teeth removed;

Figure 16 is a perspective view of a tooth modification;

Figure 17 is a perspective view of another tooth modification;

Figure 18 is a modification of a cracking wheel adapted for cracking softer shell nuts such as almonds;

Figure 19 is a view along the lines 19—19 of Figure 18;

Figure 20 is a further modification of a cracking wheel; and

Figure 21 is a cross-sectional view taken along the lines 21—21 of Figure 20.

The machine comprises a frame structure including the bars 25 and 26 for supporting the component parts of the machine. A hopper 27 is provided into which a large quantity of nuts 28 may be poured. Such nuts will fall through the mouth 29 of the hopper through gravitational action where they may enter the cracking chamber 30. A panel 31 is slidably disposed at the entrance of the cracking chamber so as to interrupt or permit the feeding of the nuts thereto.

Immediately below the top end of the cracking chamber are a pair of baffle plates 32 for guiding the nuts between the cracking wheels 33 and 34. The cracking wheels are spaced from each other to an extent determined by the average width of nuts to be cracked. This spacing is adjustable in that the wheel 34 may be laterally actuated by the screw 35.

Referring to Figure 5, it will be observed that the cracking chamber 30 is disposed within the larger chamber 40 which includes the driving gears as will be hereinafter set forth. Outer chamber 40 is open at one side and is embraced at its open side by a U-shaped piece 41, the center wall of which threadedly supports the shaft of adjusting screw 35.

The side walls of U-shaped member 41 support antifriction bearings 42 and 43 which, in turn, rotatably support shaft 44 upon which is mounted cracking wheel 34. The inner end of screw 35 is riveted to an end wall of the cracking chamber 30. The side walls of outer chamber 40 include reduced portions 50 and 51 having dovetails (Figure 4) and which are respectively formed with slots 52 and 53. Thus, when the nut 35 is rotated, the U-shaped piece 41 is actuated laterally and shaft 44, together with its bearings 42 and 43, ride in the slots 52 and 53 so as to produce an adjustment in the space S between the cracking wheels 33 and 34. The side walls of the cracking chamber are also provided with slots to permit such adjustment of the shaft 44. The shaft 54 upon which is secured cracking wheel 33 is fixed against lateral movement and is supported in antifriction bearings 55 and 56 on the respective side walls of the outer chamber.

Referring to Figure 2, it will be observed that the side wall 40a of chamber 40 bears indicia 60 which is correlated with an index mark 61. This provides means for determining the size of the spacing between the cracking wheels. Thus, if the nuts to be cracked average 1" in diameter or width, the nut 35 may be actuated until the proper spacing is indicated pursuant to the principles hereinafter set forth. Generally, nuts will be initially graded as to size so that nuts of uniform size are handled at any one time.

Wheels 33 and 34 are driven in opposite directions through the electric motor 65 and the chain of gearing illustrated. Thus, the motor 65 actuates chain 66 which drives pulley or gear 67 which is mounted on shaft 68. Shaft 68 is supported in antifriction bearings 69 and 70. Mounted on shaft 68 are two pulleys or gears 75 and 76.

Thus, pulleys 75 and 76 are likewise rotated by the motor 65.

Referring to Figure 6, it will be observed that pulley 76 is engaged by a chain 77 which drives the pulleys 78 and 79. Pulley 79 is secured to shaft 80 and serves as an idler for permitting actuation of the pulley 78 in a clockwise direction viewing the mechanism as in Figure 6. Pulley 78 is mounted on shaft 54 which drives the cracking wheel 34 so that said wheel is likewise actuated in a clockwise direction as indicated by the arrow.

Referring to Figure 7, it will be observed that shaft 68 drives pulley 75 which actuates chain 81 so as to drive pulley 82 in the direction indicated by the arrow 83. Pulley 82 is mounted on shaft 44 upon which the cracking wheel 33 is mounted. Thus, the cracking wheels 33 and 34 are actuated in opposite directions by the motor 65. An adjustable idler gear 84 operating in a slot 85 serves to provide suitable tension for the chain 81. Although the primary chain 66 is shown as driven by an electric motor, it is evident that any other type of motor such as a gasoline motor may be used. Further, the drive may be varied in many ways as will be evident.

The construction and operation of the cracking wheels are of utmost importance. As illustrated in the principal embodiment, they comprise a series of spaced teeth set into a wheel although they may be integral with such wheel. In a satisfactorily operating embodiment, each wheel was 4" in diameter and was provided with 28 teeth with their cutting edges spaced from $7/16$ to $1/2$ of an inch apart. The wheel was $1\frac{1}{2}"$ wide and weighed 10 pounds. This is suitable for hard shelled nuts such as hazel nuts or filberts.

Teeth 90 are wedge-shaped at their ends and come to a sharp edge. The wheels and teeth are of hardened steel for maintaining such sharp edges over long periods of time.

In the principal embodiment here illustrated, the cracking wheels are shown as comprising a number of individual teeth which are secured around the periphery of the wheel. Each tooth is thus removable so that it can be replaced or sharpened as desired. Furthermore, such construction makes it possible to substitute different types of teeth for acting upon and cracking different types of nuts as will hereinafter be described.

In Figure 14, is illustrated an individual tooth 90, the tooth being formed with a transverse slot 91. Slot 91 serves as a keyway and fits upon a key such as key 92 (Figure 15). Each tooth is slipped into an end opening 93 of the peripherally formed slots of the wheel until all the teeth have been set. Thereafter set screws 94 are applied to the ends of the teeth to maintain them in place, while a central, inclined set screw 95 is introduced through an opening in the periphery of the wheel. When set screw 95 is tightened down, it rests in the slot 91 as illustrated in Figure 9. These three set screws serve to firmly maintain the teeth in position and they also permit removal thereof. It will be understood, however, that the teeth may be formed as a single unit together with the wheel. For example, the cracking wheels may take the form of gears, with the teeth sharpened to assume the form illustrated.

It has been found that 4" wheels of a weight such as described should be rotated above 300 R. P. M. and up to 800 R. P. M. although the upper limit is not as critical as the lower limit. In other words, fast speed of rotation of the teeth is desirable. The reason therefor is that a slower speed will tend to produce a crushing effect rather than the sharp blow which is desired. Crushing is undesirable because it generally does not completely fracture the nut shell so as to permit release of the nut meat. On the other hand, a sharp blow tends to sever the shell as required. Translating the suggested revolutions of the 10 pound wheel into peripheral speed of the wheel, it will be recognized that the teeth should rotate at a peripheral speed of from approximately 300 to 850 feet per minute with the higher figure preferable.

Referring now to Figures 8 to 10, the cracking action of the machine will now be described. In Figure 8 the nut 100 which is to be cracked is shown enlarged for the purposes of clarity. The cracking wheels are adjusted so that the closest distance between the respective teeth of the wheels is approximately $2/3$ of the diameter of the nut so that the distance between the teeth is $1/3$ less than the diameter of the nut. Accordingly, the teeth are limited to a degree of entry into the nut which is equivalent to $1/6$ of the diameter of the nut. This produces proper cracking of the shell without undue damage to the meat even though the teeth may often contact such meat and produce a characteristic mark therein. Such contact of the meat by the blade edge is considered desirable in that it is an additional factor tending to dislodge the meat from a natural tendency of some nuts to adhere to an inner wall portion of the shell although it is not of such penetrating character as to fracture the nut meat.

As the first nut 100 falls from the hopper into the space between the cracking wheels, the teeth 90a may first support the nut or may grasp at and bite into it slightly and then propel it downwardly. However, such teeth 90a not being in horizontal alignment, the space between them is too great to crack the nut. However, as the nut continues downwardly, the succeeding teeth 90b are found to be at approximately the center line of the nut when the central, longitudinal axes of such teeth 90b are in horizontal alignment as illustrated in Figure 9. When the teeth 90b travel from their position of Figure 8 to that of Figure 9, they are caused to deliver a sharp blow to the nut shell, the impact thereof in addition to the sharpness of the teeth causing the teeth to break into the shell of the nut and splitting it as illustrated in Figure 9. The wedge-shaped teeth further tend to separate the split shell halves by prying them apart and the nut meat 101 is released as illustrated in Figure 10. The nut shell halves 100a and 100b together with the nut 101, fall into the receptacle 102 which is illustrated in Figure 1.

The above is one type of cracking action but it may be varied somewhat as the nuts fall into the cracking chamber. For example, referring to Figure 10, it will be noted that the succeeding nut 103 has been both grasped and cracked by the same set of teeth 90c. It will be recognized that should the first set of teeth contacting the nut be close enough to the transverse center of the nut to cause the teeth to penetrate sufficiently into the shell, it will become cracked by such first contacting set of teeth. In either case, the nut is given the sharp blow or impact which produces the fracture.

Many nuts are substantially round or sufficiently so that it is not material as to how they fall between the teeth of the respective wheels. As observed in Figure 11, the shell 100c of the hazel nut illustrated is substantially round with only a slight difference between the major and minor axes of the nut. This is further illustrated in Figure 12 where a cross-section through the nut meat 101 shows it to be substantially round. It has been found, however, that almost any position in which the nut falls produces effective cracking. It will be understood that a supply of nuts is first sized or graded by conventional equipment so that the sizes of the nuts in any one load is uniform thereby permitting the adjustment above mentioned.

Summarizing briefly the action of the machine, a supply of nuts 28 is poured into the hopper 27 and the motor 65 is turned on so as to actuate the cracking wheels at the desired speed. The sliding panel 31 is then retracted so that the nuts may fall between the cracking wheels. The cracking action is extremely rapid, the cracked shells and nut meats falling into the bin or receptacle 102 and being guided therein by the curved wall 104 which isolates some of the power drive mechanism from the cracking chamber. By virtue of the sharpness of the teeth and the speed of rotation, it has been found that more than 90% of the nuts are severed neatly and the whole nut meat is released in most cases. It is believed that the results achieved transcend those of any machine which has been heretofore known.

In Figure 16 is illustrated a cracking tooth 110 which is wedge-shaped at its operating end but which is formed with a concavity 111 along the edge of the tooth. The purpose thereof is to provide effective action against narrower, elongated nuts. If the blade edges are linear as illustrated in the main embodiment their contact with the nut shell remains tangential during the impact period and may be ineffetcive with a tough, elongated nut. On the other hand, the concavity 111 embraces the nut periphery and provides more effective contact in the case of such narrower elongated nuts. A wheel provided with teeth 110 will be slightly wider, i. e., 2½ inches and will weigh about 14 pounds.

The operating end 112 of the tooth 113 illustrated in Figure 17 is wedge-shaped, but the edge thereof is in alignment with one side of the blade or tooth. Thus, the edge may be considered beveled in one direction rather than in two directions as in the teeth hereinabove described. The blade of Figure 17 is particularly adaptable for nuts such as the cohuno corozo which is an extremely hard shelled nut. A wheel provided with teeth 113 will be similar in size and weight to that of the first embodiment shown in Figures 1–9.

In Figure 18 is illustrated a cracking wheel 120 which resembles that of the first embodiment but which is fabricated of live rubber rather than of hard steel. This wheel may be used with a complementary wheel in a machine such as shown in Figure 3. The rubber wheel 120 is particularly adaptable for splitting softer shell nuts such as almonds or nutmeg. As noted in Figure 19, the teeth 121 are integral with the body of the wheel. Such a wheel will weigh about six pounds, will be five inches in diameter and as much as four inches wide.

In Figures 20 and 21 are illustrated cracking wheels which are adapted to treat elongated types of Brazilian nuts. Wheel 125 has a concave periphery which is provided with mutually inwardly directed V-shaped ring blades 126. These blades serve to produce continuous deep score lines along the length of the nut which provide cracking means thereof without damaging the nut meat. A wheel of this type may weigh as much as 20 pounds, the nuts treated thereby being extremely tough. Such a wheel will be about 3 inches in width and 7 inches in diameter.

In all of the embodiments above described, the blade-like nature of the teeth in addition to the rapid rotation thereof and weight of the wheel produces a result which has long been sought for in the art, i. e., the rapid shelling of nuts with a relatively low proportion of incompletely fractured nuts and a high proportion of whole nut meats as compared to fragments thereof.

In all of the types mentioned the striking force will obviously vary with the weight of the cracking wheels. However, as outlined above, the rotational speed will be the same and the force will then be commensurate with that required for fracturing particular nuts. It is obvious that the weights and speed may be varied to produce equivalent results as those produced by employing the particular mechanism described.

It may be further noted that whereas the illustrated preferred embodiment discloses a means for initially adjusting the space between the cracking wheel to accommodate nuts of a particular average size, means may be employed to eliminate the size grading operation before feeding the nuts to the machine. Thus, I have determined that the fixed shaft 54, together with its bearings 55 and 56, may be maintained by springs in the position for cracking the smallest nut of a load. The smallest nut would be cracked without any spring action. A larger nut would cause the shaft 54 to retract automatically against the action of the spring as the nut is grasped by the blades. The force of the springs must be greater than that required to crack the nut and the spring would continuously contract and expand as the differently sized nuts are fed to the cracking wheels.

What is claimed is:

A nut cracking machine comprising an outer chamber and an inner chamber, a pair of oppositely rotatable shafts traversing both of said chambers, a pair of cracking wheels mounted on said shafts and substantially disposed in the inner chamber and power transmission mechanism for rotating said shafts in opposite directions disposed in said outer chamber, said outer chamber being formed with side walls and an open end, a U-shaped member having sides embracing a portion of said outer chamber side walls and of said open end and being slidable on said outer chamber side walls, said outer chamber side walls being formed with a slot through which one of said shafts extends, said one shaft being rotatably supported by said sides of said U-shaped member, and a regulating screw connected at one end to said inner chamber and having its shank threaded to said U-shaped member whereby rotation of said screw causes said U-shaped member to slide along said side walls and carrying said one shaft for adjusting the distance between said shafts and the cracking wheels thereof.

References Cited in the file of this patent

UNITED STATES PATENTS

| | | |
|---|---|---|
| 853,066 | Crellin | May 7, 1907 |
| 1,683,004 | Voigt | Sept. 4, 1928 |
| 1,756,986 | Miller | May 6, 1930 |
| 1,904,058 | Kotouc | Apr. 18, 1933 |
| 2,144,841 | Glaser | Jan. 24, 1939 |
| 2,481,201 | Collier | Sept. 6, 1949 |
| 2,561,170 | Bickley | July 17, 1951 |
| 2,601,421 | Thaning | June 24, 1952 |
| 2,654,054 | Morelock | Sept. 29, 1953 |

FOREIGN PATENTS

| | | |
|---|---|---|
| 10,485 | Great Britain | Apr. 28, 1914 |
| 10,976 | Australia | Feb. 1, 1934 |